(12) United States Patent
Li

(10) Patent No.: US 11,161,370 B2
(45) Date of Patent: Nov. 2, 2021

(54) WHEEL RIM ASSEMBLY

(71) Applicant: Mu-Rong Li, Taichung (TW)

(72) Inventor: Mu-Rong Li, Taichung (TW)

(73) Assignee: Great Go Cycles Inc., Taichung (TW)

( * ) Notice: Subject to any disclaimer, the term of this patent is extended or adjusted under 35 U.S.C. 154(b) by 221 days.

(21) Appl. No.: 16/584,964

(22) Filed: Sep. 27, 2019

(65) Prior Publication Data

US 2021/0094344 A1    Apr. 1, 2021

(51) Int. Cl.
| | | |
|---|---|---|
| *B60B 1/04* | (2006.01) | |
| *B60B 1/00* | (2006.01) | |
| *B60B 1/02* | (2006.01) | |
| *B60B 7/00* | (2006.01) | |

(52) U.S. Cl.
CPC .............. *B60B 1/041* (2013.01); *B60B 1/003* (2013.01); *B60B 1/0223* (2013.01); *B60B 1/042* (2013.01); *B60B 1/043* (2013.01); *B60B 7/0013* (2013.01); *B60B 2900/113* (2013.01)

(58) Field of Classification Search
CPC ......... B60B 1/041; B60B 1/042; B60B 1/043; B60B 1/003; B60B 1/0223; B60B 1/0261; B60B 1/06; B60B 1/14; B60B 7/0013; B60B 2900/113
See application file for complete search history.

(56) References Cited

U.S. PATENT DOCUMENTS

| | | | | |
|---|---|---|---|---|
| 7,658,452 | B2 * | 2/2010 | Spahr | B60B 1/0215 |
| | | | | 301/110.5 |
| 7,681,958 | B1 * | 3/2010 | Bagdasarian | B60B 1/14 |
| | | | | 301/80 |
| 9,315,071 | B2 * | 4/2016 | Webber | H02K 11/20 |
| 2009/0152938 | A1 * | 6/2009 | Tsai | B60B 5/02 |
| | | | | 301/55 |
| 2011/0193403 | A1 * | 8/2011 | Chen | B60B 1/042 |
| | | | | 301/59 |
| 2014/0062167 | A1 * | 3/2014 | Li | B60B 1/042 |
| | | | | 301/58 |

FOREIGN PATENT DOCUMENTS

DE       102015104663 A1 *  9/2016  .......... B60B 21/066

* cited by examiner

*Primary Examiner* — Kip T Kotter
*Assistant Examiner* — Emily G Castonguay

(57) ABSTRACT

A wheel rim assembly includes a hub with a case and two flanges are formed on two ends of the case. Multiple spoke units are connected between the two flanges of the hub and the inner periphery of the rim. Each spoke unit includes a first connection member and the first end of an X-shaped spoke extends from the first connection member. Each first connection member includes a first recessed area and a second recessed area respectively defined in the outside and the inside thereof. The second recessed area is matched with the flange corresponding thereto. Each first connection member includes an engaging recess and a protrusion. The protrusion of one first connection member is engaged with the engaging recess of the next first connection member. Two covers are respectively connected two ends of the hub. The second end of each spoke is inserted into reception recess of the rim.

7 Claims, 9 Drawing Sheets

WHEEL RIM ASSEMBLY

BACKGROUND OF THE INVENTION

1. Fields of the Invention

The present invention relates to a wheel rim assembly, and more particularly, to a wheel rim assembly which is easily assembled.

2. Descriptions of Related Art

The conventional bicycle wheel rims generally includes a rim, a hub and multiple spokes, wherein the hub includes two flanges on two ends thereof, and the spokes are connected between the rim and the disks of the hub. Each flange includes holes with which the first ends of the spokes are engaged, and the second ends of the spokes are inserted into the rim. However, when assembling the spokes to the flanges of the hub and the rim, the first ends of the spokes are bent and hooked to the flanges, and the second ends of the spokes are inserted into the inner periphery of the rim. The assembling steps require a lot of time and special nut are used to secure the second ends of the spokes to the rim.

The present invention intends to provide a wheel rim assembly which is easily assembled so as to eliminate the shortcomings mentioned above.

SUMMARY OF THE INVENTION

The present invention relates to a wheel rim assembly and comprises a hub having a case and two flanges are formed on two ends of the case. The hub is located at the center of a rim and the rim has multiple reception recesses defined in the inner periphery thereof. Multiple spoke units each are connected between the flanges of the hub and the inner periphery of the rim. Each spoke unit has a first connection member. The first end of a spoke extends from the first connection member. The spoke is an X-shaped spoke. The first connection member is connected to the outside of the flange corresponding thereto. Each first connection member is a curved member, and has a first recessed area and a second recessed area respectively defined in the outside and the inside thereof. The connection members of the spoke units are connected to the flange corresponding thereto. The flange is engaged with the second recessed areas of the spoke units. Each first connection member has an engaging recess defined in one of two ends thereof, a protrusion extends from the inside of each of the first connection members. The protrusion of one first connection member is engaged with the engaging recess of a next first connection member. A second end of each spoke is connected to the reception recesses of the rim. Two covers are respectively connected to two ends of the hub and cover the first connection members of the spoke units.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
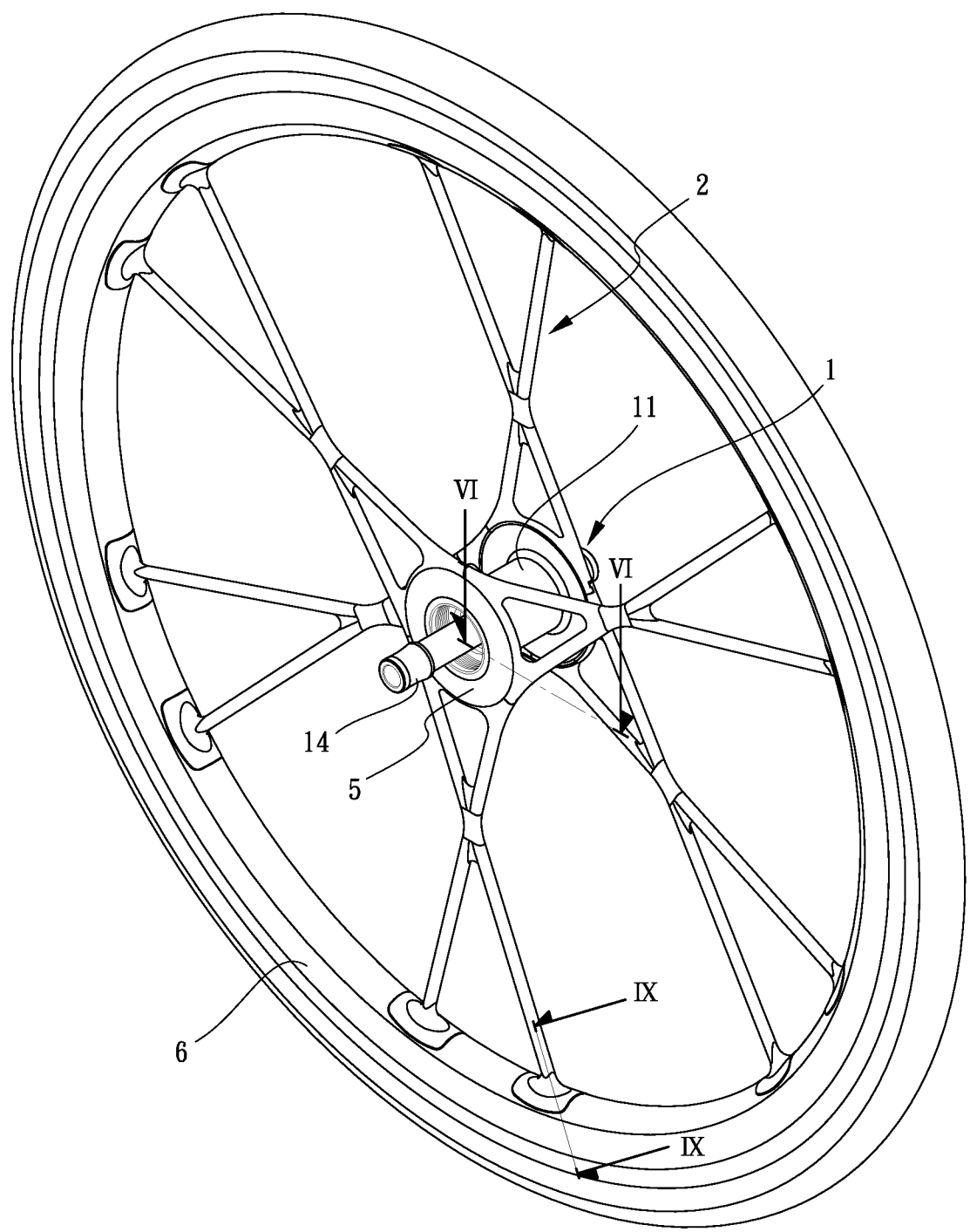
FIG. 1 is a perspective view to show the wheel rim assembly of the present invention.
Figure 2:
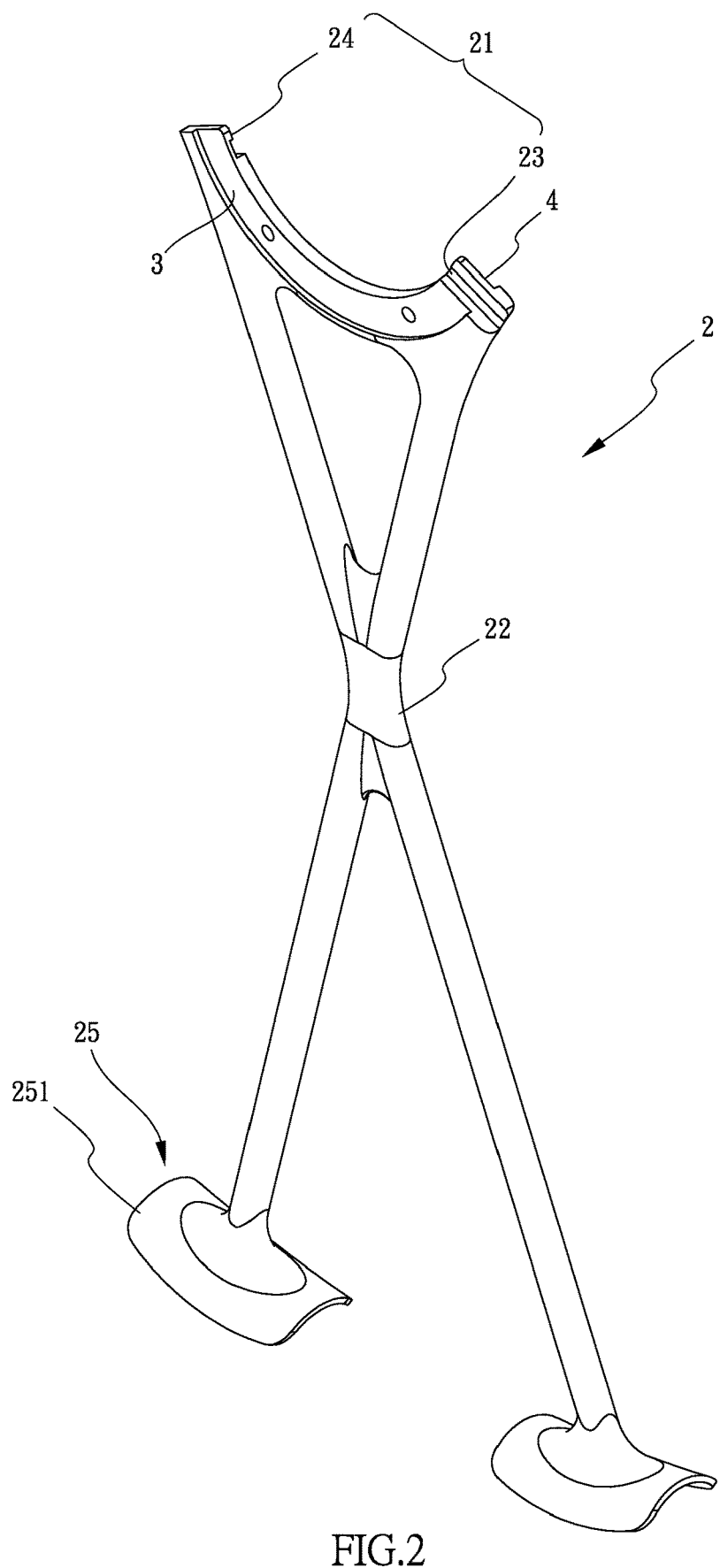
FIG. 2 is a perspective view to show the spoke unit of the wheel rim assembly of the present invention.
Figure 3:
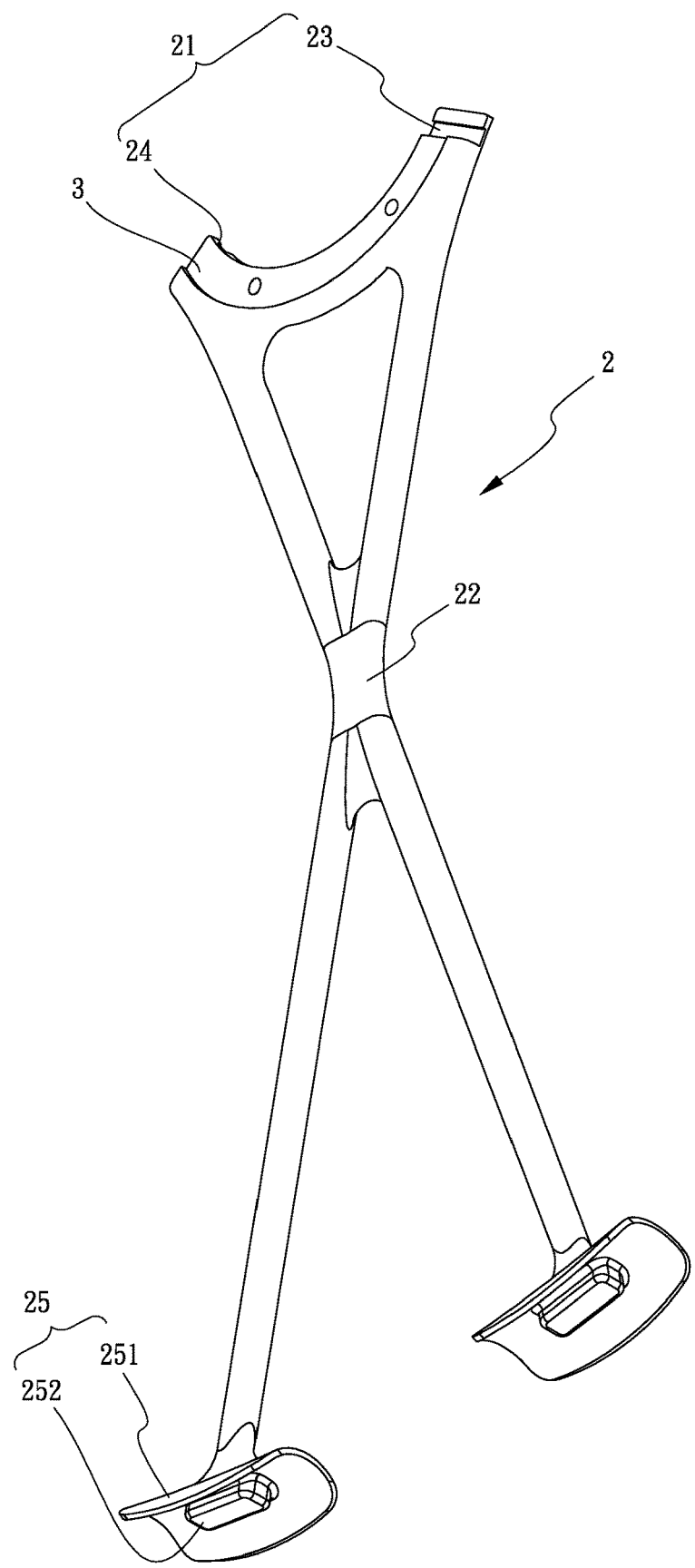
FIG. 3 is another perspective view to show the spoke unit of the wheel rim assembly of the present invention.
Figure 4:
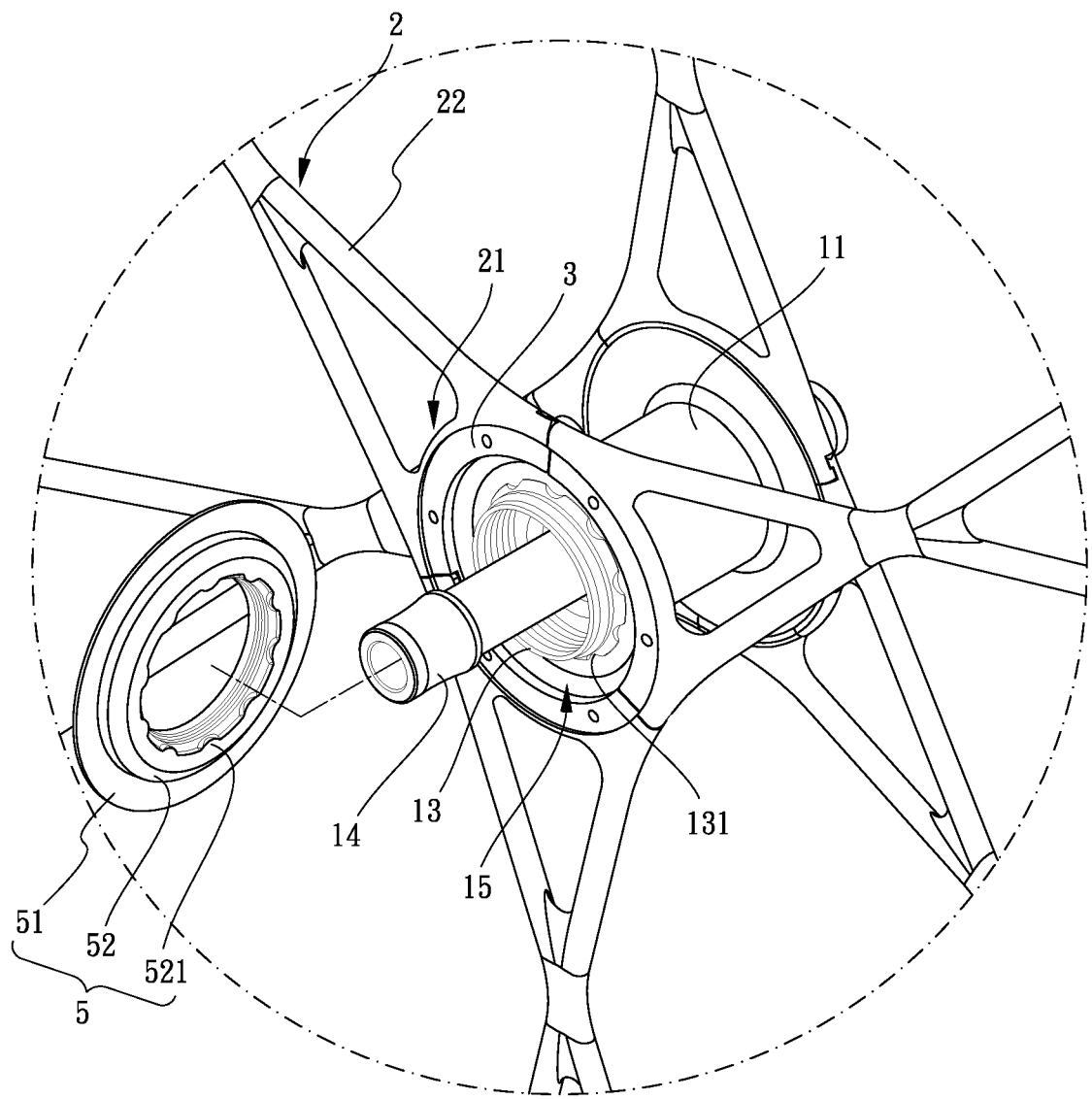
FIG. 4 is an enlarged view to show the cover is connected to the hub of the wheel rim assembly of the present invention.
Figure 5:
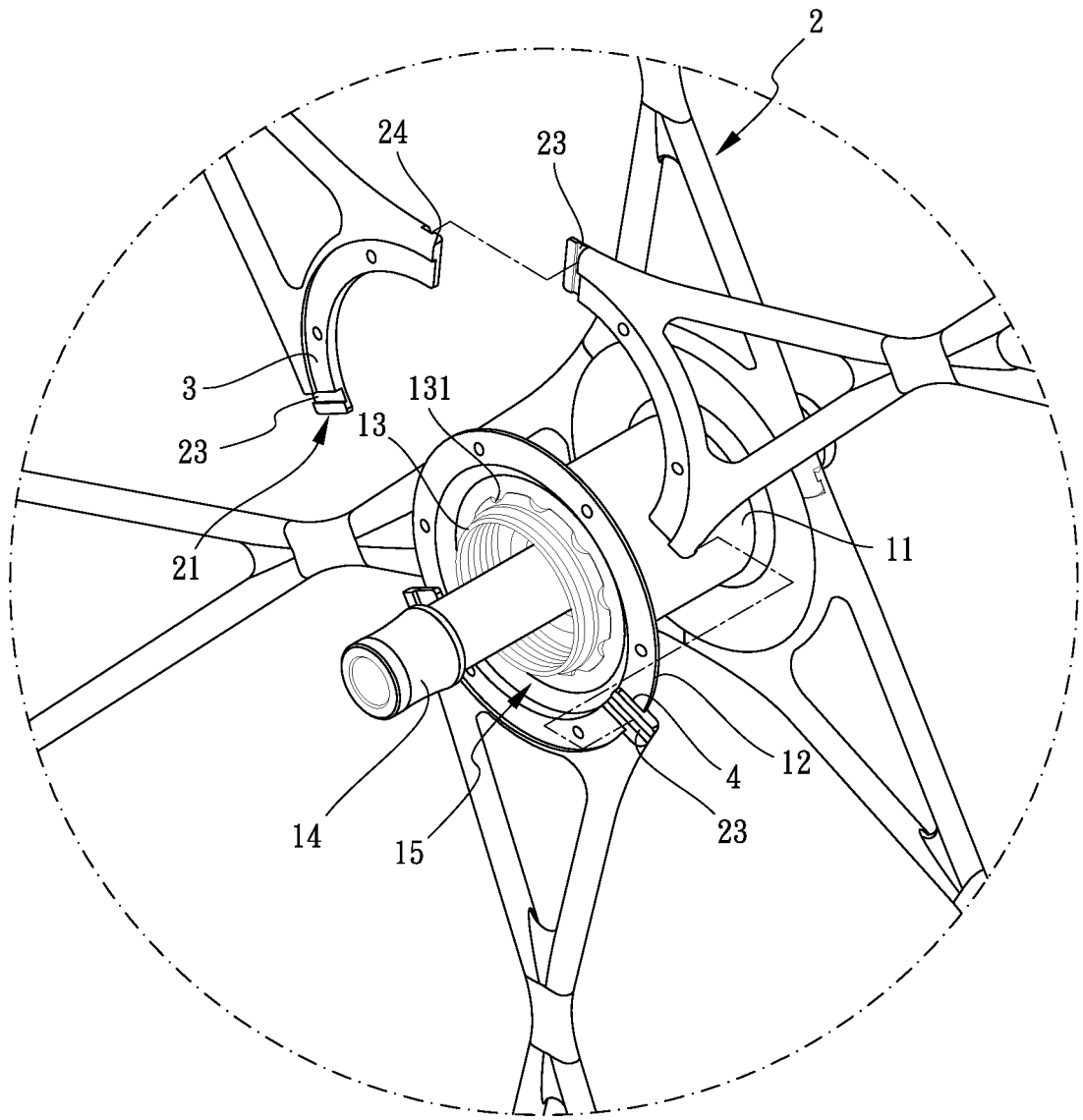
FIG. 5 is an enlarged view to show two spokes are to be connected each other.
Figure 6:
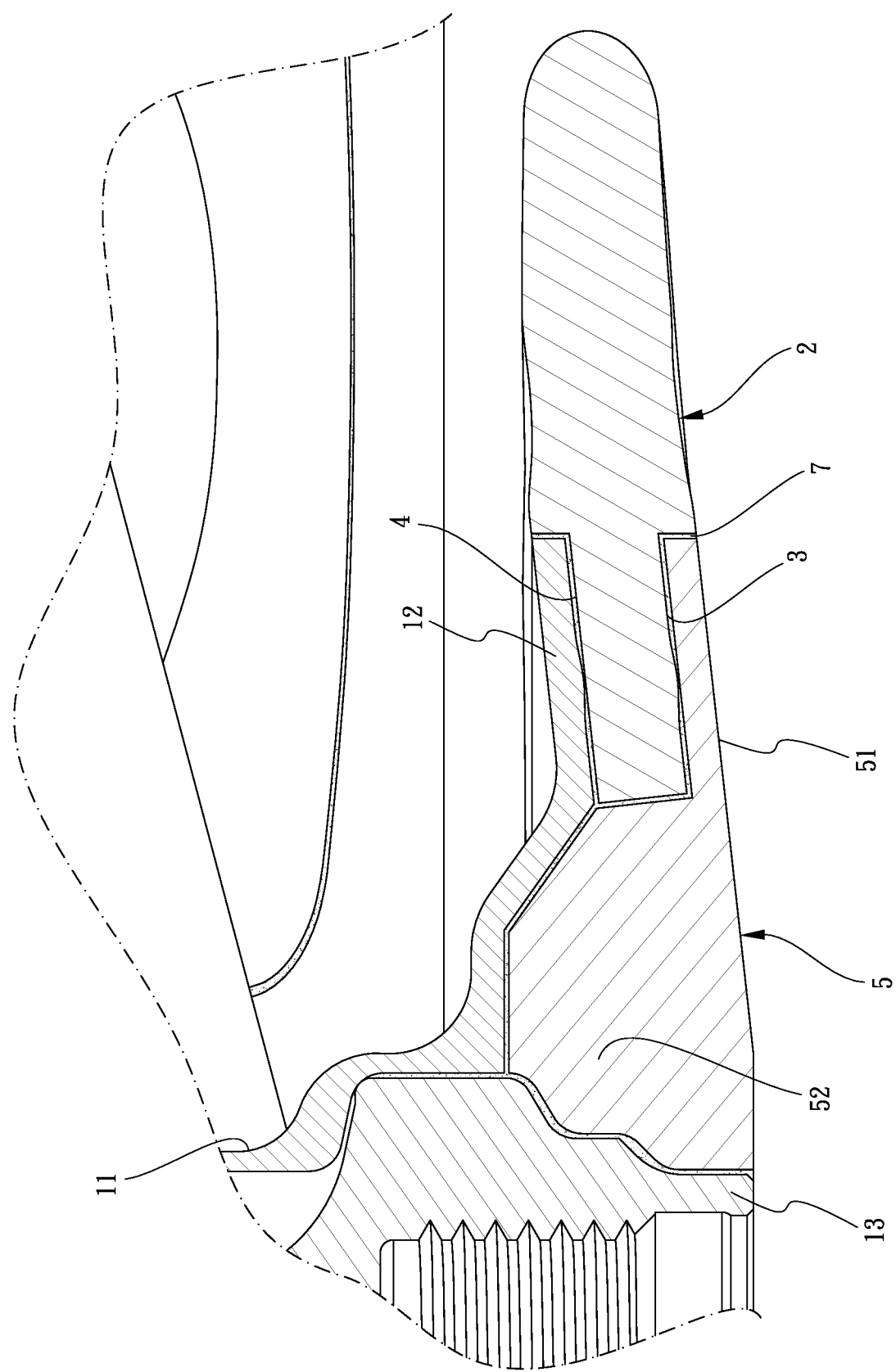
FIG. 6 is a cross sectional view, taken along line VI-VI of FIG. 1.
Figure 7:
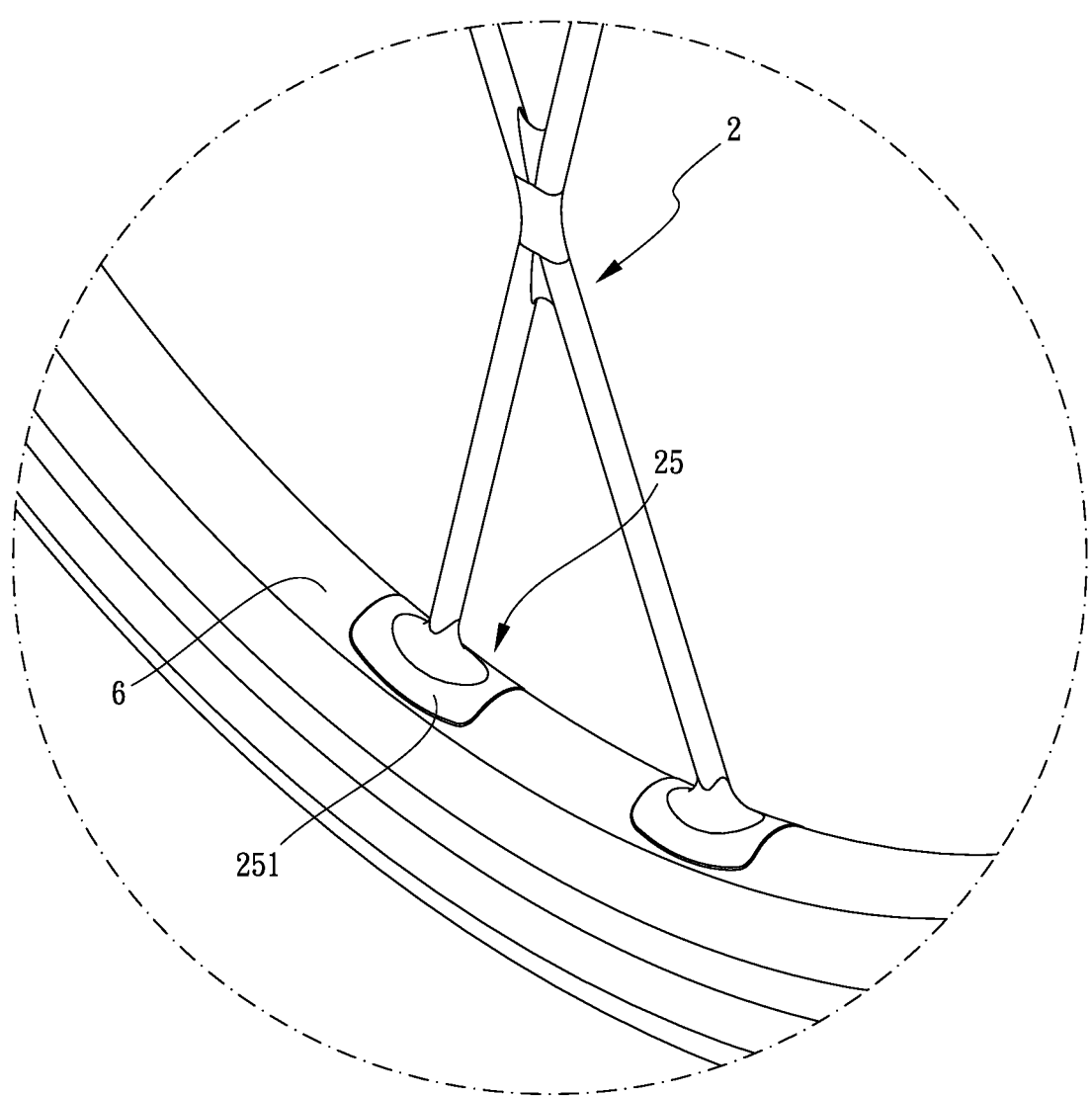
FIG. 7 shows that the two second connection members of the spoke are connected to the inner periphery of the rim.
Figure 8:
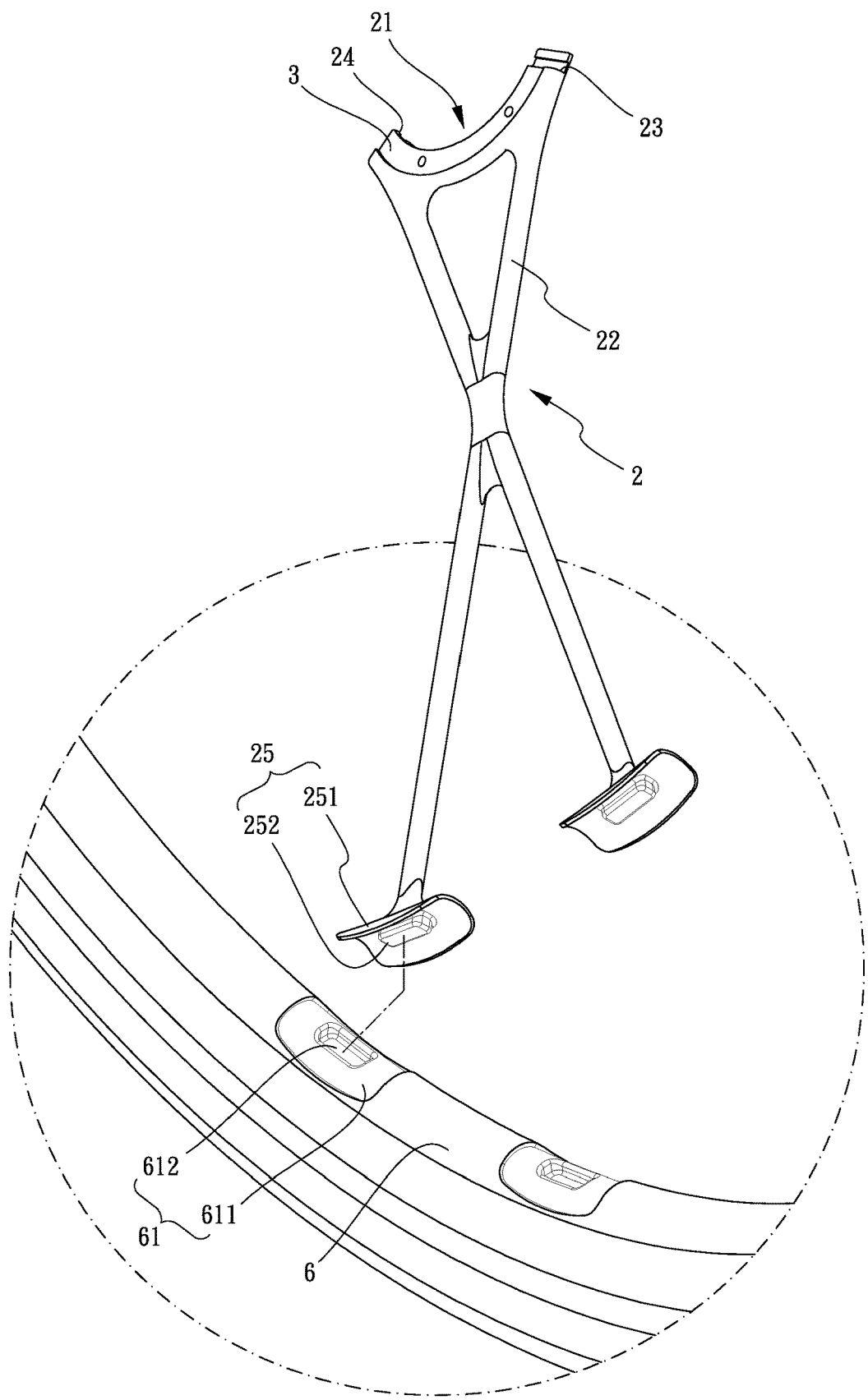
FIG. 8 shows that the spoke is to be connected to the inner periphery of the rim.
Figure 9:
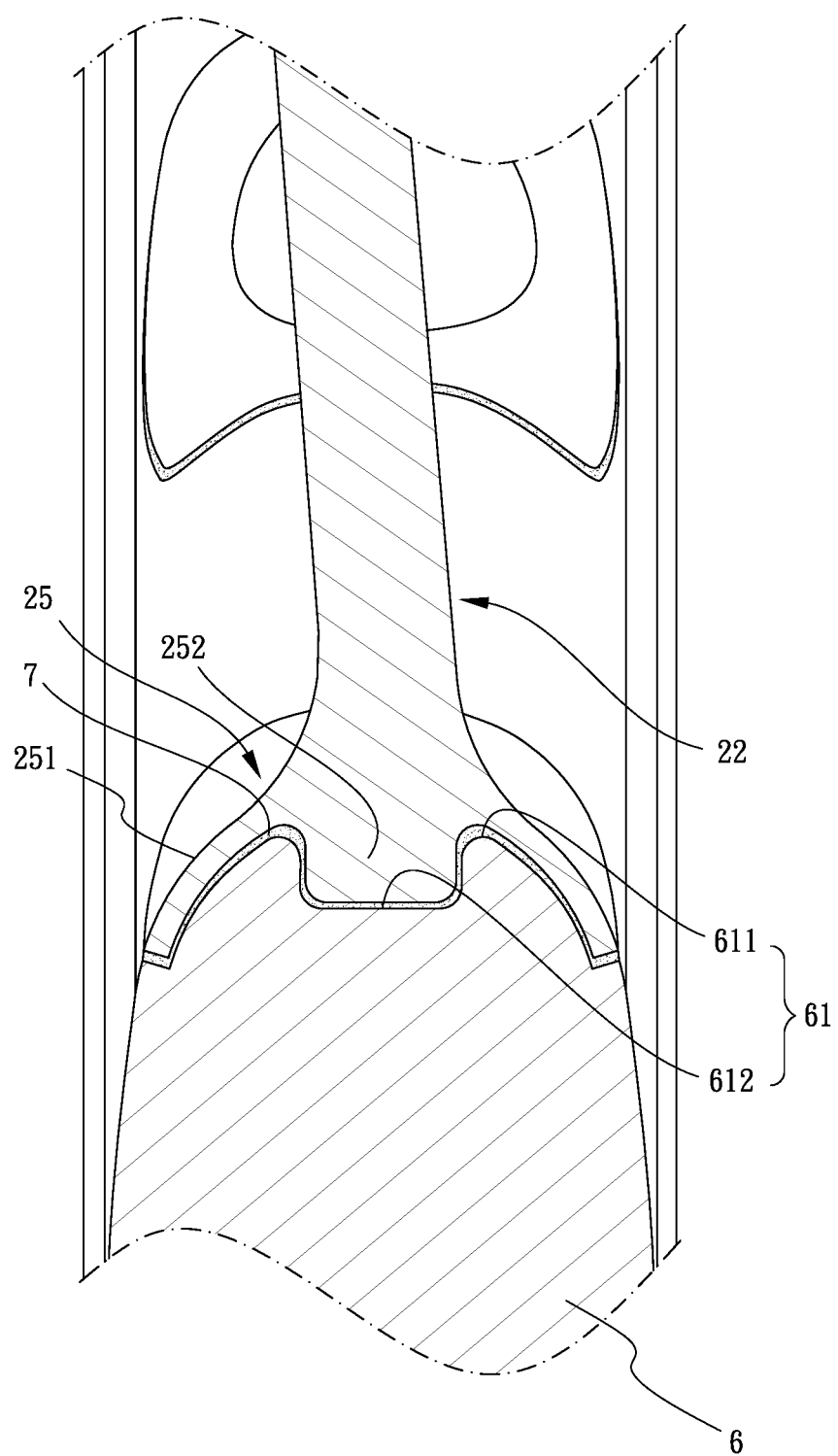
FIG. 9 is a cross sectional view, taken along line IX-IX of FIG. 1.

Referring to FIGS. 1 to 9, the bicycle wheel rim assembly of the present invention comprises a hub 1, a rim 6, and multiple spoke units 2 connected between the hub 1 and the inner periphery of the rim 6. The hub 1 includes a cylindrical case 11 and two flanges 12 are formed on two ends of the case 11. The hub 1 is located at the center of a rim 6, and the rim 6 has multiple reception recesses 61 defined in the inner periphery thereof.

Specifically, each spoke unit 2 is carbon-fiber spoke unit and connected between the flanges 12 of the hub 1 and the inner periphery of the rim 6. Each spoke unit 2 has a first connection member 21, and the first end of an X-shaped spoke 22 extends from the first connection member 21. In one embodiment, the first connection member 21 is integral with the spoke 22. The second end of each of the spokes 22 includes two distal ends and each distal end has a second connection member 25 formed thereto. The first connection member 21 is a curved member and connected to the outside of the flange corresponding thereto. Each first connection member 21 has a first recessed area 3 and a second recessed area 4 respectively defined in the outside and the inside thereof. The connection members 21 of the spoke units 2 are connected to the flange 12 of the hub 1 corresponding thereto, and the flange 12 is engaged with the second recessed areas 4 of the spoke units 2. The multiple first connection members 21 form a ring-shaped portion to match with the flange 12.

Each first connection member 21 has an engaging recess 23 defined in one of two ends thereof, and a protrusion 24 extends from the inside of each of the first connection members 21. The protrusion 24 of one first connection member 21 is engaged with the engaging recess 23 of next first connection member 21 so as to form the ring-shaped portion as mentioned before. Two covers 5 are respectively connected to two ends of the hub 1 and cover the first connection members 21 of the spoke units 2.

Each second connection member 25 includes a curved plate 251 and a tongue 252 that extends from an underside of the curved plate 251 corresponding thereto. Each reception recess 61 of the rim 6 includes a first recessed portion 611 and a second recessed portion 612 which is defined in the inner end of the first recessed portion 611. The curved plate 251 is engaged with the first recessed portion 611 corresponding thereto, and the tongue 252 is inserted into the second recessed portion 612 corresponding thereto. The curved plate 251 is in flush with the inner periphery of the rim 6.

In one embodiment, the flanges 12 are connected to the second recessed areas 4 by adherent 7, and the covers 5 are connected to the first recesses areas 3 by adherent 7. Each curved plate 251 is connected to the first recessed portion 611 corresponding thereto by adherent 7, and the tongue 252 is connected to the second recessed portion 612 corresponding thereto by adherent 7.

The hub 1 includes two cup members 13 and an axle 14. The two cup members 13 are located at two ends of the hub case 11. An annular groove 15 is formed between the flanges 12 of the case 11 and the cup member 13 in each of the two ends of the hub 1. The axle 14 extends through the case 11 and the two cup members 13.

Each of the covers 5 includes a disk 51 and a ring 52 which extends from one side of the disk 51. The disk 51 is received in and contacts the inner end of the first recessed areas 3 of the spoke units 2. The ring 52 of each of the two covers 5 is inserted in the annular groove 15 corresponding thereto. Specifically, each cup member 13 includes multiple positioning recesses 131 formed in the outer periphery thereof. The ring 52 of each of the covers 5 includes multiple bosses 521 which are engaged with the positioning recesses 131 of the cup member 13 corresponding thereto.

The assembly of the present invention saves time and the spokes 22 do not need to be bent and no threads and nuts needed. The spoke units 2, the case 11 and the rim 6 can be made by carbon-fiber which is light and durable.

While we have shown and described the embodiment in accordance with the present invention, it should be clear to those skilled in the art that further embodiments may be made without departing from the scope of the present invention.

What is claimed is:

1. A wheel rim assembly comprising:
a hub having a case and two flanges formed on two ends of the case, the hub located at a center of a rim, the rim having multiple reception recesses defined in an inner periphery thereof;
multiple spoke units each connected between die flanges of the hub and the inner periphery of the rim, each spoke unit having a first connection member, a first end of a spoke extending from the first connection member, the spoke being an X-shaped spoke, the first connection member axially connected to an outboard of the flange corresponding thereto, each first connection member being a curved, member, and having a first recessed area and a second recessed area respectively and axially defined in an outboard side and an inboard side thereof, the connection members of the spoke units connected to the flange corresponding thereto, and the flange engaged with the second recessed areas of the spoke units, each first connection member having an engaging recess defined in one of two ends thereof, a protrusion extending axially from the inboard side of each of the first connection members, the protrusion of one first connection member being engaged with the engaging recess of another first connection member, a second end of each spoke connected to the reception recesses of the rim, and two covers respectively connected to two ends of the hub and covering the first connection members of the spoke units.

2. The wheel rim assembly as claimed in claim 1, wherein the flanges are connected to the second recessed areas by adherent, the covers are connected to the first recessed areas by adherent.

3. The wheel rim assembly as claimed in claim 1, wherein the second end of each of the spokes includes two distal ends and each distal end has a second connection member formed thereto, each second connection member includes a curved plate and a tongue that extends from an underside of the curved plate corresponding thereto, each reception recess of the rim includes a first recessed portion and a second recessed portion which is defined radially in an inner end of the first recessed portion, the curved plate is engaged with the first recessed portion corresponding thereto, and the tongue is inserted into the second recessed portion corresponding thereto, the curved plate is in flush with the inner periphery of the rim.

4. The wheel rim assembly as claimed in claim wherein the second end of each of the spokes includes two distal ends and each distal end has a second connection member formed thereto, each second connection member includes a curved plate and a tongue that extends from an underside of the curved plate corresponding thereto, each reception recess of the rim includes a first recessed portion and a second recessed portion which is defined radially in an inner end of the first recessed portion, the curved plate is engaged with the first recessed portion corresponding thereto, and the tongue is inserted into the second recessed portion corresponding thereto, the curved plate is in flush with the inner periphery of the rim, each curved plate is connected to the first recessed portion corresponding thereto by adherent, the tongue is connected to the second recessed portion corresponding thereto by adherent.

5. The wheel rim assembly as claimed in claim 1, wherein the first connection member is integral with the spoke.

6. The wheel rim assembly as claimed in claim 5, wherein each of the covers includes a disk and a ring which extends from one side of the disk, the disk is received in and contacts an inner end of the first recessed areas of the spoke units, the hub includes two cup members and an axle, the two cup members are located at two ends of the hub, an annular groove is formed between the flanges of the case and the cup member in each of the two ends of the hub, the axle extends through the case and the two cup members, the ring of each of the two covers is inserted in the annular groove corresponding thereto.

7. The wheel rim assembly as claimed in claim 6, wherein each cup member includes multiple positioning recesses formed in an outer periphery thereof, the ring of each of the covers includes multiple bosses which are engaged with the positioning; recesses of the cup member corresponding thereto.

* * * * *